(12) United States Patent
Athley et al.

(10) Patent No.: US 12,308,911 B2
(45) Date of Patent: May 20, 2025

(54) SIGNAL PRECODING

(71) Applicant: Telefonaktiebolaget LM Ericsson (publ), Stockholm (SE)

(72) Inventors: Fredrik Athley, Västra Frölunda (SE); Xinlin Zhang, Västra Frölunda (SE); Mattias Frenne, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 21 days.

(21) Appl. No.: 18/270,446

(22) PCT Filed: Nov. 18, 2021

(86) PCT No.: PCT/EP2021/082194
§ 371 (c)(1),
(2) Date: Jun. 29, 2023

(87) PCT Pub. No.: WO2022/144128
PCT Pub. Date: Jul. 7, 2022

(65) Prior Publication Data
US 2024/0063854 A1    Feb. 22, 2024

Related U.S. Application Data

(60) Provisional application No. 63/131,888, filed on Dec. 30, 2020.

(51) Int. Cl.
*H04B 7/0456* (2017.01)
*H04B 7/06* (2006.01)

(52) U.S. Cl.
CPC ......... *H04B 7/0456* (2013.01); *H04B 7/0626* (2013.01)

(58) Field of Classification Search
CPC .. H04B 7/0478; H04B 7/0456; H04B 7/0626; H04B 7/0639; H04B 7/0634; H04B 7/10;
(Continued)

(56) References Cited

U.S. PATENT DOCUMENTS

2013/0142319 A1*  6/2013  Lu .................. H04M 11/062
                                                         379/93.08
2020/0068563 A1*  2/2020  Wu .................. H04L 5/0005
(Continued)

FOREIGN PATENT DOCUMENTS

JP      2018-511271 A     4/2018
WO   WO-2021148629 A1 *  7/2021  ........... H04B 7/0469

OTHER PUBLICATIONS

Qualcomm Incorporated, "CSI enhancements: MTRP and FR1 FDD reciprocity", R1-2006796, 3GPP TSG RAN WG1 #102-e, e-Meeting, Aug. 17-28, 2020, pp. 1-11 (Year: 2020).*
(Continued)

*Primary Examiner* — Sophia Vlahos
(74) *Attorney, Agent, or Firm* — Rothwell, Figg, Ernst & Manbeck, P.C.

(57) ABSTRACT

A method (700) for precoding a signal. The method includes determining (s702), based on uplink, UL, measurements, a spatial domain (SD) precoding vector and a frequency domain (FD) precoding vector for a downlink (DL) transmission of the signal. The method also includes applying (s704) the FD precoding vector to the signal over subcarriers for carrying the signal, thus producing a modified signal. The method further includes applying (s706) the SD precoding vector to the modified signal to produce a precoded signal, wherein the SD precoding vector is common for all said subcarriers in one symbol.

11 Claims, 8 Drawing Sheets

(58) Field of Classification Search
CPC ... H04B 7/0617; H04B 7/0695; H04B 7/0413
See application file for complete search history.

(56) References Cited

U.S. PATENT DOCUMENTS

| | | | |
|---|---|---|---|
| 2023/0145057 A1 | 5/2023 | Zhang et al. | |
| 2023/0163911 A1* | 5/2023 | Hao | H04B 7/063 370/329 |
| 2024/0048325 A1* | 2/2024 | Hao | H04L 5/005 |

OTHER PUBLICATIONS

International Search Report and Written Opinion dated Oct. 5, 2022 issued in International Patent Application No. PCT/EP2021/082194 (20 pages).
International Preliminary Report on Patentability dated Jul. 4, 2023 issued in International Patent Application No. PCT/EP2021/082194 (14 pages).
NTT DOCOMO, Inc, "Discussion on CSI enhancements", R1-2009180, 3GPP TSG RAN WG1 #103-e, e-Meeting, Oct. 26-Nov. 13, 2020 (11 pages).
CATT, "CSI enhancements for MTRP and FR1 FDD with partial reciprocity", R1-2005689, 3GPP TSG RAN WG1 Meeting #102-e, e-Meeting, Aug. 17-28, 2020 (8 pages).
Lenovo et al., "Additional SRS symbols", RI-1808547, 3GPP TSG RAN WG 1 Meeting #94, Goteborg, Sweden, Aug. 20-24, 2018 (2 pages).
Fraunhofer IIS et al., "CSI enhancements on Type II PS codebook and multi-TRP", R1-2008901, 3GPP TSG RAN WG1 #103-e, e-Meeting, Oct. 26-Nov. 13, 2020 (11 pages).
Samsung, "CSI-RS for Beam Management", R1-1707971, 3GPP TSG RAN WG1 89, Hangzhou, China, May 15-19, 2017 (7 pages).
Spreadtrum Communications, "CSI-RS design for CSI acquisition", RI-1710365, 3GPPTSG RANWG1 NR Ad-Hoc#2, Qingdao, China, Jun. 27-30, 2017 (5 pages).
3GPP TS 38.331 V15.5.1, Apr. 2019, Technical Specification, 3rd Generation Partnership Project; Technical Specification Group Radio Access Network; NR; Radio Resource Control (RRC) protocol specification (Release 15) (491 pages).
3GPP TS 38.211 V15.7.0, Sep. 2019, Technical Specification, 3rd Generation Partnership Project; Technical Specification Group Radio Access Network; NR; Physical channels and modulation (Release 15) (97 pages).
ETSI TS 138 211 V16.3.0, Nov. 2020, Technical Specification, 5G; NR; Physical channels and modulation (3GPP TS 38.211 version 16.3.0 Release 16) (136 pages).
3GPP TS 38.211 V16.6.0, Jun. 2021, Technical Specification, 3rd Generation Partnership Project; Technical Specification Group Radio Access Network; NR; Physical channels and modulation (Release 16) (134 pages).
ZTE, "CSI enhancements for Multi-TRP and FR1 FDD reciprocity", R1-2007769, 3GPP TSG RAN WG1 #103-e, e-Meeting, Oct. 26-Nov. 13, 2020, www.3gpp.org/ftp/TSG_RAN/WG1_RL1/TSGR1_103-e/Docs/R1-2007769.zip (13 pages).

* cited by examiner f*(m): FD precoder weights on subcarrier m.
r(m): signal on subcarrier m.
r̃(m): modified signal on subcarrier m.
b: wideband SD precoder.
Y(n,:): precoded signal on the nth antenna port over all M occupied subcarriers. Y(n,:)=[b(n)r̃(1),...,b(n)r̃(M)]

SIGNAL PRECODING

CROSS REFERENCE TO RELATED APPLICATIONS

This application is a 35 U.S.C. § 371 National Stage of International Patent Application No. PCT/EP2021/082194, filed Nov. 18, 2021, which claims priority to U.S. provisional patent application No. 63/131,888, filed on Dec. 30, 2020, which is incorporated by this reference.

TECHNICAL FIELD

This disclosure relates to precoding of signals, such as, for example, a channel state information reference signal (CSI-RS).

BACKGROUND

1. Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The 3rd Generation Partnership Project (3GPP) New Radio (NR) standard is currently evolving with enhanced MIMO support. A core component in NR is the support of MIMO antenna deployments and MIMO related techniques like for instance spatial multiplexing. The spatial multiplexing mode is aimed for high data rates in favorable channel conditions. An illustration of the spatial multiplexing operation is provided in FIG. 1A.

As seen in FIG. 1A, the information carrying symbol vector s is multiplied by an $N_T \times r$ matrix W (which is referred to below as the "precoder matrix"), which serves to distribute the transmit energy in a subspace of the $N_T$ dimensional vector space (corresponding to $N_T$ antenna ports). The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

NR uses orthogonal frequency division multiplexing (OFDM) in the downlink (and DFT precoded OFDM in the uplink for rank- 1 transmission) and hence the received $N_R \times 1$ vector $y_n$ for a certain TFRE on subcarrier n (or alternatively data TFRE number n) is thus modeled by:

$$y_n = H_n W s_n + e_n$$

where $e_n$ is a noise/interference vector obtained as realizations of a random process. The precoder matrix W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE.

In closed-loop precoding for the NR downlink, the UE transmits, based on channel measurements in the downlink, recommendations to the NR base station (denoted "gNB") of a suitable precoder matrix to use. The gNB configures the UE to provide feedback according to CSI-ReportConfig and may transmit CSI-RS and configure the UE to use measurements of CSI-RS to feed back recommended precoding matrices that the UE selects from a codebook. A single precoder matrix that is supposed to cover a large bandwidth (wideband precoding) may be fed back. It may also be beneficial to match the frequency variations of the channel and instead feed back a frequency-selective precoding report, e.g. several precoder matrices, one per subband. This is an example of the more general case of channel state information (CSI) feedback, which also encompasses feeding back other information than recommended precoder matrices to assist the gNodeB in subsequent transmissions to the UE. Such other information may include channel quality indicators (CQIs) as well as transmission rank indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 PRBS depending on the band width part (BWP) size.

Given the CSI feedback from the UE, the gNB determines the transmission parameters it wishes to use to transmit data to the UE, including the precoding matrix, transmission rank, and modulation and coding scheme (MCS). These transmission parameters may differ from the recommendations the UE makes. The transmission rank, and thus the number of spatially multiplexed layers, is reflected in the number of columns of the precoder matrix W. For efficient performance, it is important that a transmission rank that matches the channel properties is selected.

2. 2D Antenna Arrays

A two-dimensional antenna array may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N = N_h \times N_v \times N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port. An example of a 4×4 array with dual-polarized antenna elements is illustrated in FIG. 1B.

Precoding a signal may be interpreted as multiplying the signal with different precoding (a.k.a., "beamforming") weights for each antenna prior to transmission. A typical approach is to tailor the precoder matrix to the antenna form factor, i.e. taking into account $N_h$, $N_v$, and $N_p$ when designing the precoder matrix codebook.

The codebooks have been designed with a specific antenna numbering in mind (or rather port numbering scheme, where the mapping of antenna port to physical antenna is up to each deployment). For a given P antenna ports, the precoding codebooks are designed so that the P/2 first antenna ports should map to a set of co-polarized antennas and the P/2 last antenna ports are mapped to another set of co-polarized antennas, with an orthogonal polarization to the first set. This is thus targeting dual-polarized antenna arrays. FIG. 1C illustrates an example with eight antenna ports.

3. Channel State Information Reference Signals (CSI-RS)

In NR, a CSI-RS is a reference symbol sequence introduced for the intent to estimate channel state information. By measuring on a CSI-RS, a UE can estimate the effective channel the CSI-RS is traversing, including the radio propagation channel and antenna gains. In more mathematical rigor this implies that if a known CSI-RS signal X is transmitted, a UE can estimate the coupling between the transmitted signal and the received signal (i.e., the effective channel). Hence, if no virtualization is performed in the transmission, the received signal y can be expressed as: y=Hx+e, and the UE can estimate the effective channel H. Up to 32 CSI-RS ports can be configured for an NR UE. That is, the UE can estimate the channel from up to thirty-two transmit antenna ports.

An antenna port is equivalent to a reference signal resource that the UE shall use to measure the channel. Hence, gNB with two antennas could define two CSI-RS ports, where each port is a set of resource elements in the time frequency grid within a subframe or slot. The base station transmits each of these two reference signals from each of the two antennas so that the UE can measure the two radio channels and report channel state information back to the base station based on these measurements. In NR, CSI-RS resources with 1,2,4,8,12,16,24 and 32 ports are supported.

The sequence used for CSI-RS is r(m) and is defined by $$r(m) = \frac{1}{\sqrt{2}}(1 - 2c(2m)) + j\frac{1}{\sqrt{2}}(1 - 2c(2m + 1)),$$

where the pseudo-random sequence c(i) is defined in clause 5.2.1 of 3GPP TS 38.211. The pseudo-random sequence generator shall be initialised with:

$$c_{init} = (2^{10}(N_{symb}^{slot} n_{s,f}^{\mu} + l + 1)(2n_{ID} + 1) + n_{ID}) \bmod 2^{-}$$

at the start of each OFDM symbol where $n_{s,f}^{\mu}$ is the slot number within a radio frame, l is the OFDM symbol number within a slot, and $n_{ID}$ equals the higher-layer parameter scramblingID or sequenceGenerationConfig.

3.1 CSI-RS Port Mapping

There are 18 different CSI-RS resource configurations in NR, where each has a specific number of ports X, see 3GPP Technical Specification (TS) 38.211. When CDM is applied, the index $k_i$ indicates the first subcarrier in the PRB that is used for mapping the CSI-RS sequence to resource elements, where the second subcarrier is $k_i+1$. This set ($k_i$, $k_i+1$) of two subcarriers is associated with a CDM group j, where a CDM group covers 1, 2 or 4 OFDM symbols. The index $l_i$, or $l_i+1$, indicates the first OFDM symbol within the slot that is associated with a CDM group. The parameters $k_i$ and $l_i$ are signalled from gNB to UE by RRC signalling when configuring the CSI-RS resource.

When CDM is applied, the size of a CDM group (L) is either 2, 4 or 8 and the total number of CDM groups is given by the number of ($k_i$, $l_i$), ($k_i$, $l_i+1$) pairs given by the configuration. A CDM group can thus refer to a set of 2, 4 or 8 antenna ports, where the set of 2 antenna ports occurs when only CDM in frequency-domain (FD) over two adjacent subcarriers is considered (FD-CDM2).

According to section 7.4.1.5.3 of TS 38.211, CSI-RS ports are numbered within a CDM group first and then across CDM groups. The UE shall assume that a CSI-RS is transmitted using antenna ports p numbered according to:

$$p=3000+s+jL;$$

$$j=0,1,\ldots,N/L-1,$$

$$s=0,1,\ldots,L-1;$$

where s is the sequence index, L∈{1,2,4,8} is the CDM group size, and N is the number of CSI-RS ports. The CDM group index j given in Table 7.4.1.5.3-1 in 38.211 corresponds to the time/frequency locations ($\bar{k}$, $\bar{l}$) for a given row of the table. This table is reproduced below for convenience. For example, CSI-RS resource configuration given by row 4 in Table 1 has two CDM groups (j=0,1) of size L=2, where the ports 3000 and 3001 maps to the CDM group indicated by $k_0$ and the ports 3002 and 3003 maps to the CDM group indicated by $k_0+2$.

TABLE 1

| Row | Ports X | Density ρ | cdm-Type | ($\bar{k}$, $\bar{l}$) | CDM group index j | k' | l' |
|---|---|---|---|---|---|---|---|
| 1 | 1 | 3 | noCDM | ($k_0$, $l_0$), ($k_0 + 4$, $l_0$), ($k_0 + 8$, $l_0$) | 0, 0, 0 | 0 | 0 |
| 2 | 1 | 1, 0.5 | noCDM | ($k_0$, $l_0$), | 0 | 0 | 0 |
| 3 | 2 | 1, 0.5 | fd-CDM2 | ($k_0$, $l_0$), | 0 | 0, 1 | 0 |
| 4 | 4 | 1 | fd-CDM2 | ($k_0$, $l_0$), ($k_0 + 2$, $l_0$) | 0, 1 | 0, 1 | 0 |
| 5 | 4 | 1 | fd-CDM2 | ($k_0$, $l_0$), ($k_0$, $l_0 + 1$) | 0, 1 | 0, 1 | 0 |
| 6 | 8 | 1 | fd-CDM2 | ($k_0$, $l_0$), ($k_1$, $l_0$), ($k_2$, $l_0$), ($k_3$, $l_0$) | 0, 1, 2, 3 | 0, 1 | 0 |
| 7 | 8 | 1 | fd-CDM2 | ($k_0$, $l_0$), ($k_1$, $l_0$), ($k_0$, $l_0 + 1$), ($k_1$, $l_0 + 1$) | 0, 1, 2, 3 | 0, 1 | 0 |
| 8 | 8 | 1 | cdm4-FD2-TD2 | ($k_0$, $l_0$), (k1, $l_0$) | 0, 1 | 0, 1 | 0, 1 |
| 9 | 12 | 1 | fd-CDM2 | ($k_0$, $l_0$), ($k_1$, $l_0$), ($k_2$, $l_0$), ($k_3$, $l_0$), ($k_4$, $l_0$), ($k_5$, $l_0$) | 0, 1, 2, 3, 4, 5 | 0, 1 | 0 |
| 10 | 12 | 1 | cdm4-FD2-TD2 | ($k_0$, $l_0$), ($k_1$, $l_0$), ($k_2$, $l_0$) | 0, 1, 2 | 0, 1 | 0, 1 |
| 11 | 16 | 1, 0.5 | fd-CDM2 | ($k_0$, $l_0$), ($k_1$, $l_0$), ($k_2$, $l_0$), ($k_3$, $l_0$), ($k_0$, $l_0 + 1$), ($k_1$, $l_0 + 1$), ($k_2$, $l_0 + 1$), ($k_3$, $l_0 + 1$) | 0, 1, 2, 3, 4, 5, 6, 7 | 0, 1 | 0 |
| 12 | 16 | 1, 0.5 | cdm4-FD2-TD2 | ($k_0$, $l_0$), ($k_1$, $l_0$), ($k_2$, $l_0$), ($k_3$, $l_0$) | 0, 1, 2, 3 | 0, 1 | 0, 1 |
| 13 | 24 | 1, 0.5 | fd-CDM2 | ($k_0$, $l_0$), ($k_1$, $l_0$), ($k_2$, $l_0$), ($k_0$, $l_0 + 1$), ($k_1$, $l_0 + 1$), ($k_2$, $l_0 + 1$), ($k_0$, $l_1$), ($k_1$, $l_1$), ($k_2$, $l_1$), ($k_0$, $l_1 + 1$), ($k_1$, $l_1 + 1$), ($k_2$, $l_1 + 1$) | 0, 1, 2, 3, 4, 5, 6, 7, 8, 9, 10, 11 | 0, 1 | 0 |

TABLE 1-continued

| Row | Ports X | Density ρ | cdm-Type | ($\bar{k}$, $\bar{l}$) | CDM group index j | k' | l' |
|---|---|---|---|---|---|---|---|
| 14 | 24 | 1, 0.5 | cdm4-FD2-TD2 | $(k_0, l_0)$, $(k_1, l_0)$, $(k_2, l_0)$, $(k_0, l_1)$, $(k_1, l_1)$, $(k_2, l_1)$ | 0, 1, 2, 3, 4, 5 | 0, 1 | 0, 1 |
| 15 | 24 | 1, 0.5 | cdm8-FD2-TD4 | $(k_0, l_0)$, $(k_1, l_0)$, $(k_2, l_0)$ | 0, 1, 2 | 0, 1 | 0, 1, 2, 3 |
| 16 | 32 | 1, 0.5 | fd-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0 + 1)$, $(k_0, 4)$, $(k_1, l_1)$, $(k_2, l_1)$, $(k_3, l_1)$, $(k_0, l_1 + 1)$, $(k_1, l_1 + 1)$, $(k_2, l_1 + 1)$, $(k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | cdm4-FD2-TD2 | $(k_0, l_0)$, $(k_1, l_0)$, $(k_2, l_0)$, $(k_3, l_0)$, $(k_0, l_1)$, $(k_1, l_1)$, $(k_2, l_1)$, $(k_3, l_1)$ | 0, 1, 2, 3, 4, 5, 6, 7 | 0, 1 | 0, 1 |
| 18 | 32 | 1, 0.5 | cdm8-FD2-TD4 | $(k_0, l_0)$, $(k_1, l_0)$, $(k_2, l_0)$, $(k_3, l_0)$ | 0, 1, 2, 3 | 0, 1 | 0, 1, 2, 3 |

4. CSI Framework in NR

In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report. Each CSI reporting setting may contain at least the following information: a CSI-RS resource set for channel measurement; an IMR resource set for interference measurement; a CSI-RS resource set for interference measurement; time-domain behavior, i.e. periodic, semi-persistent, or aperiodic reporting; frequency granularity, i.e. wideband or subband; CSI parameters to be reported such as RI, PMI, CQI, and CSI-RS resource indicator (CRI) in case of multiple CSI-RS resources in a resource set; Codebook types, i.e. type I or II, and codebook subset restriction; measurement restriction; and subband size (one out of two possible subband sizes is indicated, the value range depends on the bandwidth of the BWP; one CQI/PMI (if configured for subband reporting) is fed back per subband.

When the CSI-RS resource set in a CSI reporting setting contains multiple CSI-RS resources, one of the CSI-RS resources is selected by a UE and a CSI-RS resource indicator (CRI) is also reported by the UE to indicate to the gNB about the selected CSI-RS resource in the resource set, together with RI, PMI and CQI associated with the selected CSI-RS resource.

For aperiodic CSI reporting in NR, more than one CSI reporting settings, each with a different CSI-RS resource set for channel measurement and/or resource set for interference measurement can be configured and triggered at the same time. In this case, multiple CSI reports are aggregated and sent from the UE to the gNB in a single Physical Uplink Shared Channel (PUSCH) transmission.

5. NR Release 16 (Rel-16) Enhanced Type II Port Selection Code book

Enhanced Type II (eType II) port selection (PS) codebook was introduced in Rel-16, which is intended to be used for beamformed CSI-RS, where each CSI-RS port covers a small portion of the cell coverage area with high gain (comparing to non-beamformed CSI-RS). Although it is up to the gNB implementation, it is usually assumed that each CSI-RS port is transmitted in a 2D spatial beam which has a main lobe with an azimuth pointing angle and an elevation pointing angle. The actual precoder matrix used for CSI-RS is transparent to UE. Based on the measurement, UE selects the best CSI-RS ports and recommends to gNB to use for DL transmission. The eType II PS codebook can be used by UE to feedback the selected CSI-RS ports and the way to combine them.

5.1 Structure, Configuration and Reporting of eType II PS Codebook

For a given transmission layer l, with $l \in \{1, \ldots, v\}$ and v being the rank indicator (RI), the precoder matrix for all FD-units is given by a size $P_{CSI-RS} \times N_3$ matrix $W_l$, where P_CSI-RS is the number of CSI-RS ports; N_3=N_SB×R is the number of PMI subbands, where the value R={1,2} (the PMI subband size indicator) is RRC configured and N_SB is the number of CQI bands, which is also RRC configured; the RI value v is set according to the configured higher layer parameter typeII-RI-Restriction-r16. UE shall not report v>4.

The precoder matrix $W_l$ can be factorized as $W_l = W_1 \tilde{W}_{2,l} W_{f,l}^H$, and $W_l$ is normalized such that $\|W_l\|_F = 1/\sqrt{v}$, for l=1, ..., v. $W_1$ is a size $P_{CSI-RS} \times 2L$ port selection matrix that can written as:

$$W_1 = \begin{bmatrix} W_{PS} & 0 \\ 0 & W_{PS} \end{bmatrix}$$

where
$W_{PS}$ is a size $$\frac{P_{CSI-RS}}{2} \times L$$

port selection matrix consisting zeros and ones. Selected ports are indicated by ones which are common for both polarizations.

L is the number of selected CSI-RS ports per polarization. Supported L values can be found in Table 1.
$W_1$ is common for all layers.
$W_{f,l}$ is a size $N_3 \times M_v$ frequency-domain (FD) compression matrix for layer l, where $$M_v = \left\lceil p_v \frac{N_3}{R} \right\rceil$$

is the number of selected FD precoding vectors, which depends on the rank indicator v and the RRC configured parameter $p_v$ (supported values of $p_v$ can be found in Table 1); $W_{f,l} = [f_{0,l} \, f_{1,l} \ldots f_{M_v,l}]$, where if $\{f_{k,l}\}_{k=0}^{M_v-1}$ are $M_v$ size $N_3 \times 1$ FD precoding vectors that are selected from $N_3$ orthogonal DFT basis vectors $\{y_t\}_{t=0}^{N_3-1}$ with size $N_3 \times 1$; and $W_{f,l}$ is layer-specific.

$\tilde{W}_{2,l}$ is a size $2L \times M_v$ linear combination coefficient matrix that contains $2LM_v$ coefficients for linearly combining the selected $M_v$ FD precoding vectors for the selected $2L$ CSI-RS ports. For layer l, only a subset of $K_l^{NZ} \leq K_0$ coefficients are non-zero and reported. The remaining $2LM_v - K_l^{NZ}$ non-reported coefficients are considered zero. The amplitude and phase of coefficients in $\tilde{W}_{2,l}$ shall be quantized for reporting. $\tilde{W}_{2,l}$ is layer-specific.

TABLE 1

Rel-16 eType II PS codebook parameter configurations for L, $p_v$, and β

| paramCombination-r16 | L | $p_v$ $v \in \{1, 2\}$ | $v \in \{3, 4\}$ | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |

SUMMARY

Certain challenges presently exist. For instance, there is an implementation complexity problem in the gNB when the gNB transmits with many different beamformers (e.g. different $W_l$ in different resource blocks) at the same time, e.g. in the same OFDM symbol. From a complexity perspective it is ideal to transmit a single beam (single $W_l$) with one or at most two ports, one per polarization, transmitted in a wideband manner. That is, the same precoder matrix $W_l$ (a.k.a., "beamformer") is used across the whole transmission bandwidth and for both polarizations, in one OFDM symbol. It is a problem that the current structure of CSI-RS port to resource element and OFDM symbol mapping in NR cause high implementation complexity.

This disclosure provides means to reduce the implementation complexity. In one aspect there is provided a method for precoding a signal (e.g., a CSI-RS, a PDSCH signal, etc.). The method is performed by a base station (gNB). The method includes determining, based on uplink measurements, a spatial domain (SD) precoding vector and a frequency domain (FD) precoding vector for a downlink (DL) transmission of the signal. The method also includes applying the FD precoding vector to the signal over the subcarriers for carrying the signal, thus producing a modified signal. The method further includes applying the SD precoding vector to the modified signal to produce a precoded signal (Y), wherein the SD precoding vector is common for all said subcarriers in one symbol (e.g., OFDM symbol).

In another aspect, there is provided another method performed by the base station. The method includes grouping ports that belong to a common beam but have different delay pre-compensation. The method further includes transmitting the grouped ports in one OFDM symbol.

In another aspect, there is provided a further method performed by the base station. The method includes configuring a CSI-RS resource with N antenna ports for a UE, wherein the CSI-RS resource is distributed across L OFDM symbols and each OFDM symbol transmits P CSI-RS ports where P<N. The method further includes, for each of the L OFDM symbols, using a single wideband precoding vector for all P CSI-RS ports, wherein each of the P CSI-RS ports is associated with a delay created by modifying a CSI-RS sequence.

In another aspect there is provided a computer program comprising instructions which when executed by processing circuitry of a base station, causes the base station to perform the methods disclosed herein. In another aspect there is provided a carrier containing the computer program, wherein the carrier is one of an electronic signal, an optical signal, a radio signal, and a computer readable storage medium.

In another aspect there is provided a base station where the base station is adapted to perform the method of any embodiments disclosed herein. In some embodiments, the base station includes processing circuitry; and a memory containing instructions executable by the processing circuitry, whereby the base station is operative to perform the methods disclosed herein.

An advantage of the embodiments is that the implementation complexity is significantly reduced because the embodiments do not use a precoder matrix (i.e., a 2-dimensional matrix) to generate a delay compensation. Instead, a common beamforming weight vector (a.k.a., spatial domain (SD) precoding vector) can be applied over the entire bandwidth within an OFDM symbol, and this is what reduces the complexity of the implementation of a beamformed signal. The freed up processing resources can be used for, for example, precoding of PDDCH and/or PDSCH in order to increase performance.

BRIEF DESCRIPTION OF THE DRAWINGS

The accompanying drawings, which are incorporated herein and form part of the specification, illustrate various embodiments.

DETAILED DESCRIPTION

Figure 1A:
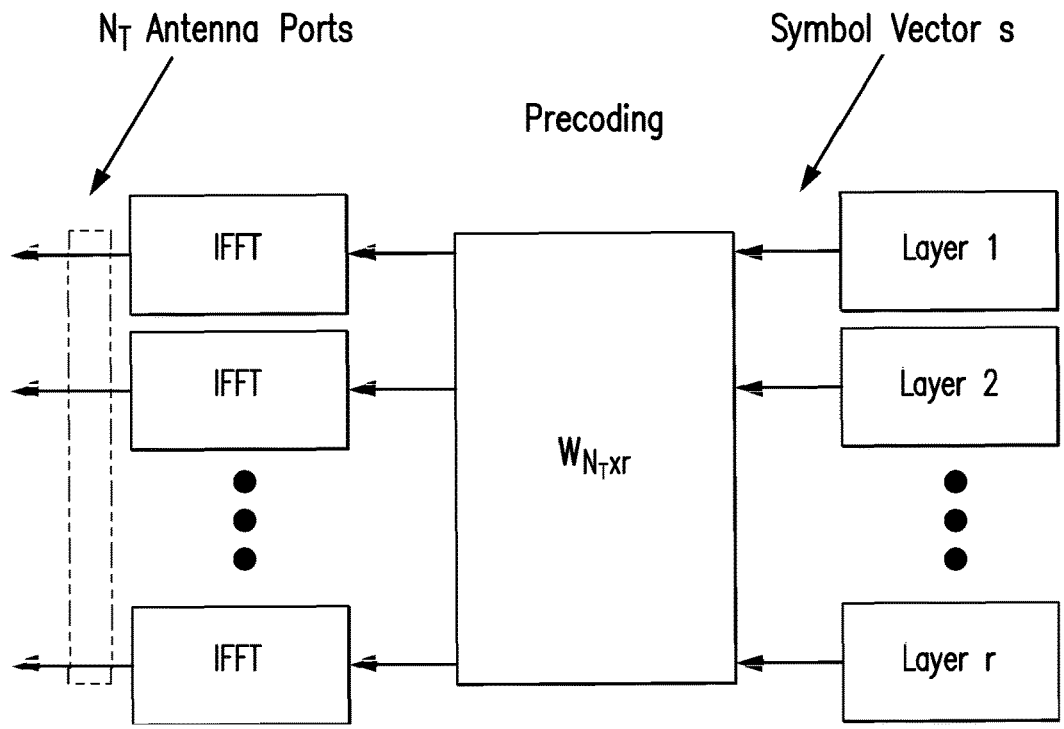
FIG. 1A illustrates spatial multiplexing.
Figure 1B:
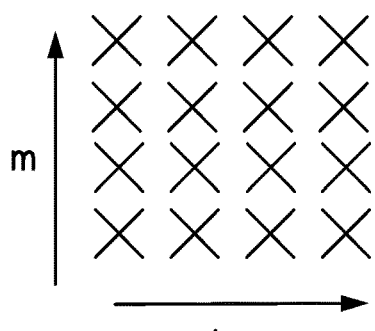
FIG. 1B illustrates an antenna array with dual-polarized antenna elements.
Figure 1C:
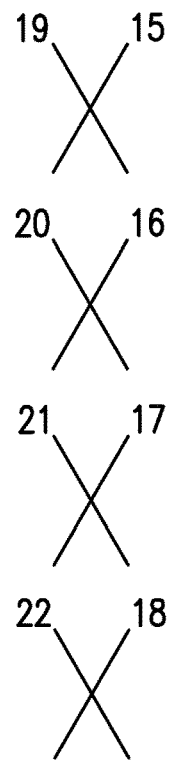
FIG. 1C illustrates an example of port numbering of eight antenna ports.
Figure 2:
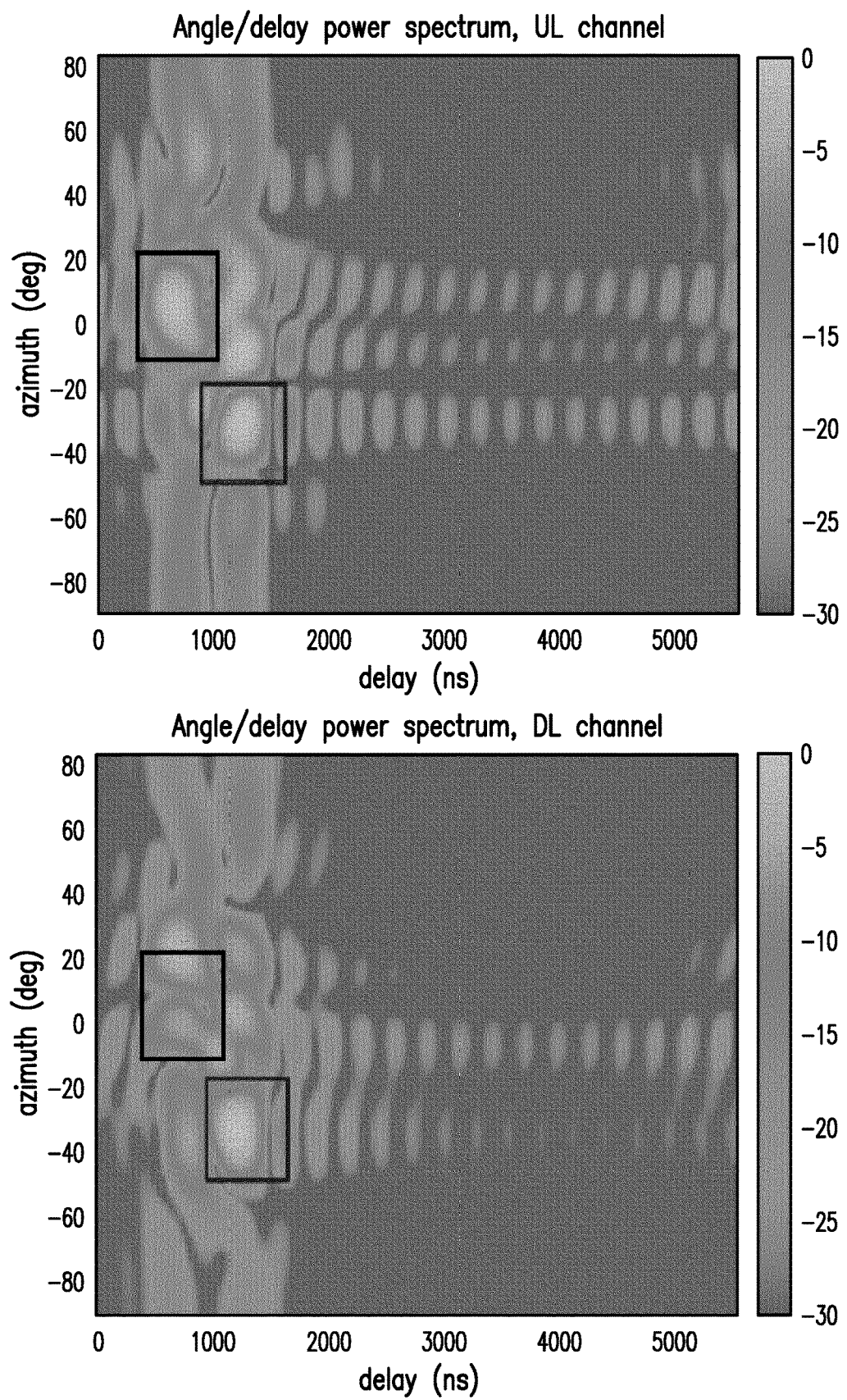
FIG. 2 compares the angle/delay power spectrum of an UL channel and the corresponding DL channel.

In Frequency Division Duplex (FDD), full reciprocity does not hold between UL and DL channels since the small-scale fading is different at the two different frequencies. However, some large-scale channel parameters, such as angles and delays to clusters, can still be reciprocal as the physical propagation environment is the same at both frequencies. FIG. 2 compares the angle/delay power spectrum of an UL channel and the corresponding DL channel, which are drawn according to the 3GPP 38.901 channel model at 2 GHz with 200 MHz duplex distance. It is observed that the power spectrum in UL and DL are quite similar. Dominant clusters seen in the UL also appears at similar angles and delays in the DL. However, there is still some differences, which are caused by independent small-scale fading realizations.

Figure 3:
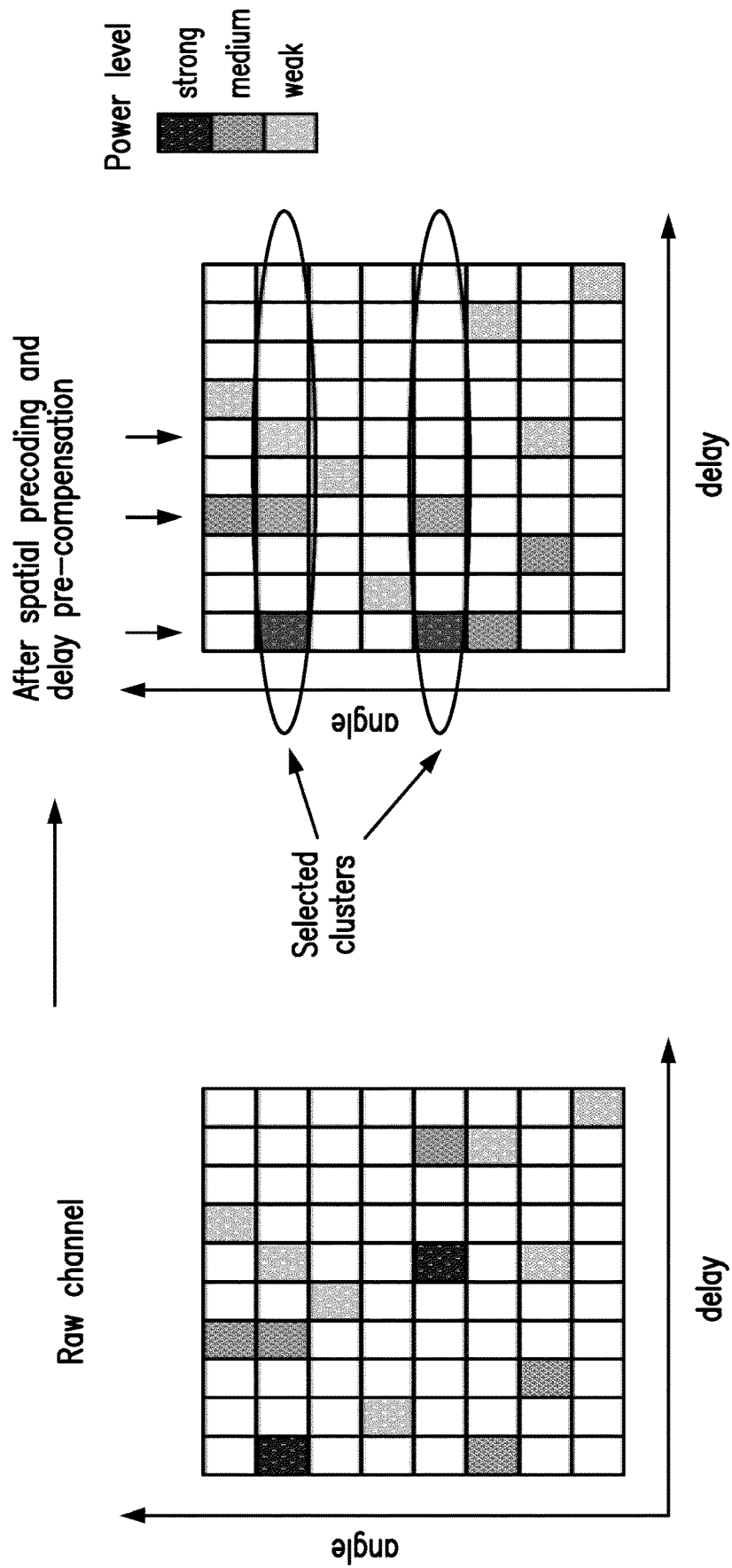
FIG. 3 illustrates an example where two CSI-RS ports are precoded

In light of the above, delay reciprocity can be utilized in addition to angle reciprocity in CSI-RS precoding, in order to reduce the frequency selectivity of precoded channel seen at the UE side. To be more specific, each CSI-RS port can be precoded using a pair of vectors consisting of a spatial domain (SD) precoding vector and frequency domain (FD) precoding vector, where the SD precoding vector is used to beamform towards a selected cluster while the FD precoding vector pre-compensates the delay to that cluster. FIG. 3 illustrates an example where two CSI-RS ports are precoded. After delay pre-compensation, the dominant taps in the two clusters are aligned to the first tap. Then, the UE can compress the FD channel with fewer FD precoding vectors. Multiple delays in the same angle can also be pre-compensated by precoding one CSI-RS port per delay. The UE can then filter out the zero-th delay component for each port in order to obtain amplitude and phase for each delay.

Figure 4:
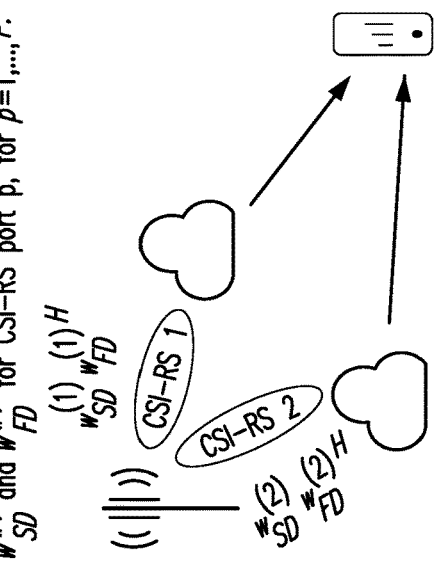
FIG. 4 illustrates an example procedure for reciprocity based FDD transmission.
Figure 4:
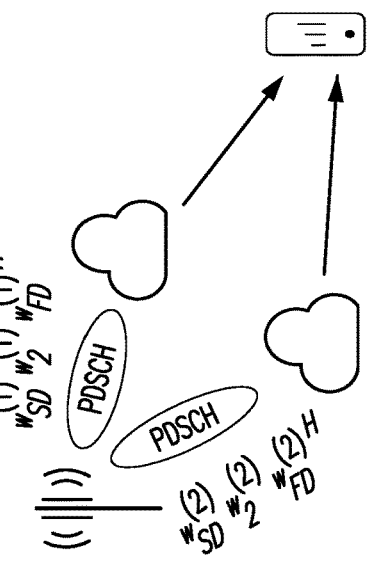
Figure 4:
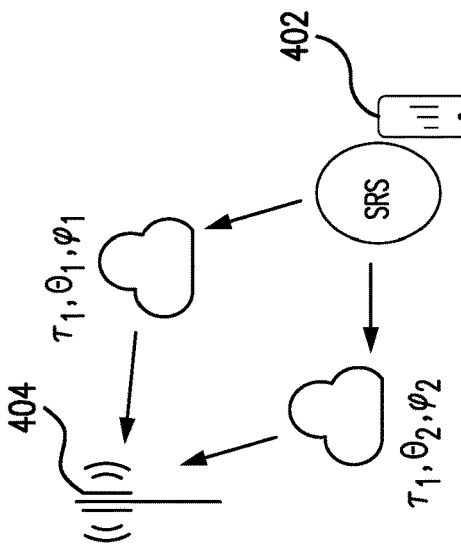
Figure 4:
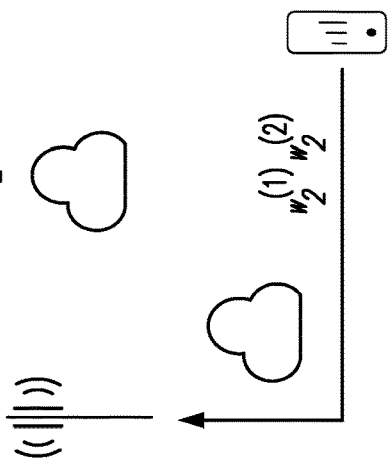

Angle/delay reciprocity for FDD is currently being studied in 3GPP Rel-17 for enhancing the Type II port selection codebook. One example procedure for reciprocity based FDD transmission scheme is illustrated in FIG. 4.

In Step 1, a user equipment (UE) 402 is configured by a gNB 404 to transmit a Sounding Reference Signal (SRS) to enable the gNB to estimate the angles and delays of different clusters, which are associated with different propagation paths. As used herein a UE is any device capable of wirelessly communicating with a base station (e.g., gNB).

In Step 2, the gNB selects dominant clusters according to the estimated angle-delay power spectrum profile, based on which a set of spatial-domain and frequency-domain (SD-FD) precoding vector pairs are computed by gNB for CSI-RS beamforming. Each CSI-RS port can contain one or multiple SD-FD precoding vector pairs. gNB precodes all the CSI-RS ports in a configured CSI-RS resource to the UE.

In Step 3, gNB has configured the UE to measure CSI-RS, and the UE measures the received CSI-RS ports and then determines a type II CSI including RI, PMI for each layer and CQI. The precoding matrix indicated by the PMI includes the selected SD-FD precoding vector pairs/precoded CSI-RS ports, and the corresponding best phase and amplitude for co-phasing the selected pairs/ports. The phase and amplitude for each pair/port are quantized and fed back to the gNB.

In Step 4, the gNB implementation algorithm computes the DL precoding matrix per layer based on the selected beams and the corresponding amplitude and phase feedback and performs PDSCH transmission.

Such reciprocity-based transmission can potentially be utilized in a codebook-based DL transmission for FDD in order to, for example, reduce the feedback overhead in UL when NR Type II port-selection codebook is used. Another potential benefit is reduced complexity in the CSI calculation in the UE.

In a radio propagation environment, there may exist multiple channel clusters in a similar direction but at different delays. Therefore, in the enhanced Type II port-selection codebook being considered for Rel. 17, the gNB may apply delay pre-compensation for multiple channel taps in the same beam. One way to achieve this is to assign one CSI-RS port per channel tap (and per polarization) and apply delay pre-compensation for each such port. Hence, there may be multiple CSI-RS ports corresponding to the same beam but different taps.

Performing delay pre-compensation by operations in frequency domain amounts to applying a linear phase slope over frequency on the beamforming vector, where the slope is proportional to the delay. This can be expressed as: $\tilde{b}(\phi_0, f) = e^{-i2\pi f \tau} b(\phi_0)$, where $\tilde{b}$ is the delay-precompensated beamforming vector, f is frequency, $\tau$ is the delay to be compensated, and $b(\phi_0)$ is a frequency independent (i.e. wideband) beamformer in the direction $\phi_0$. With P taps per beam, a port can be assigned for each tap so that a tap p is associated with a beamforming vector $\tilde{b}_p(\phi_0, f) = e^{-i2\pi f \tau_p} b(\phi_0)$, p=1, ..., P, where $\tau_p$ and $\phi_0$ is the delay and angle, respectively, to to the p-th tap.

Figure 5:
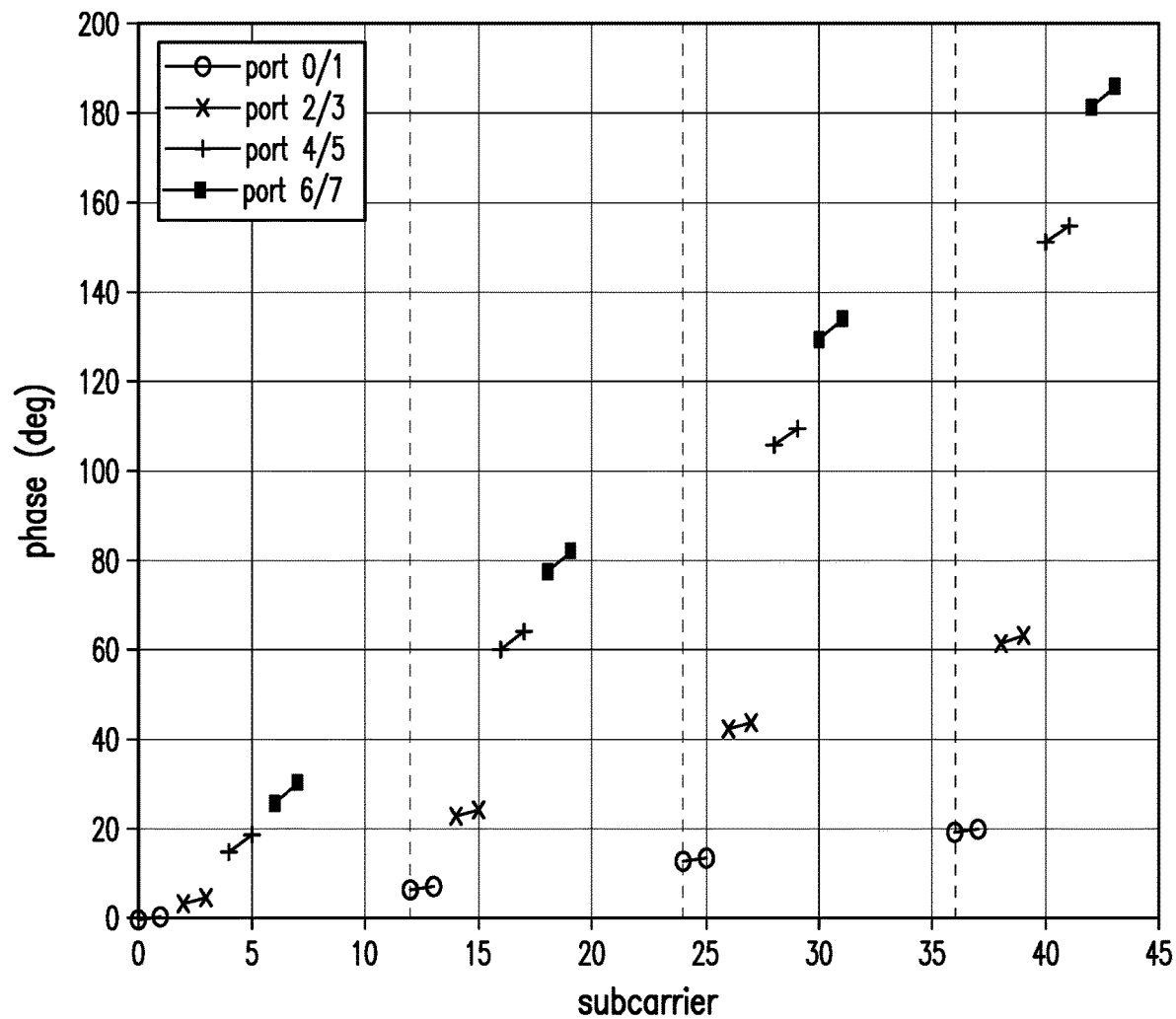
FIG. 5 shows an example of how the phase of the delay pre-compensation can vary over subcarriers when delay pre-compensation is performed for a case with eight CSI-RS ports mapped to the same symbol.

FIG. 5 shows an example of how the phase of the delay pre-compensation, $2\pi f \tau_p$, can vary over subcarriers when delay pre-compensation is performed for a case with eight CSI-RS ports mapped to the same symbol. It is assumed here that there are four pairs of ports where the ports within one pair correspond to the same tap but different polarizations and that the different pairs correspond to taps with different delays. This CSI-RS configuration corresponds to a modified version of row 6 in Table 1, where the modification is made in order to make ports corresponding to the same beam and different polarizations belong to the same CDM group.

It can be seen in the figure that multiple different phase slopes are present in each resource block even if all ports in the symbol correspond to the same beam. This means that the same beamforming vector cannot be used over the bandwidth despite all ports correspond to a beam in the same direction. Hence, there is high implementation complexity when there are multiple delay pre-compensated CSI-RS ports in one symbol.

In more general terms, a CSI-RS sequence, r(m), precoded in SD and FD over N antennas and M subcarriers can be written as:

$$Y = WR \quad (1)$$

where Y is an N×M matrix containing the precoded CSI-RS signal samples over all antennas and subcarriers and $$W = bf^H \quad (2)$$

is an N×M SD/FD precoding matrix where b is an N×1 SD precoding vector and f is an M×1 FD precoding vector. For example, the SD and FD precoding vectors can be DFT vectors. Physically, this means that the CSI-RS port is beamformed in a specific direction and shifted in delay in order to pre-compensate the channel delay. The direction and delay are determined from measurements on SRS or DMRS transmitted in the UL.

The SD and FD precoding vectors can also be more general than having DFT structure, e.g., based on SVD of measurements on the UL channel matrix. Furthermore, $$R = \text{diag}(r), r = [r(1) \ldots r(M)]^T,$$

is an M×M diagonal matrix containing, for example, the CSI-RS sequence r(m) (m=1 to M) along the diagonal. As another example R is an M×M diagonal matrix containing the PDSCH samples per subcarrier.

Figure 6:
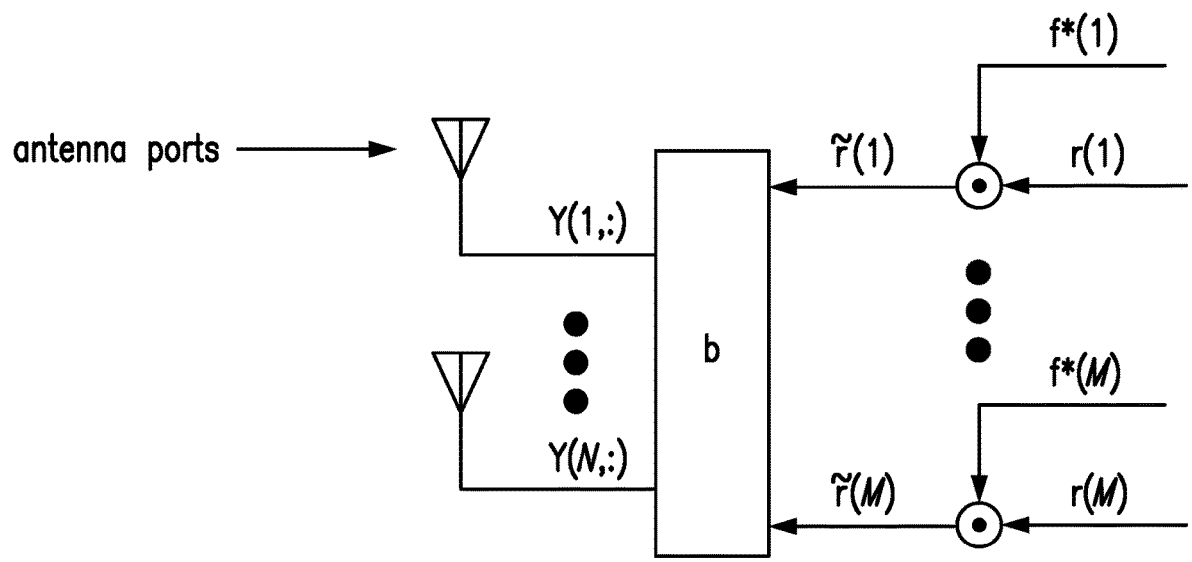
FIG. 6 illustrates a precoding process according to an embodiment.

Equation (1) can be rewritten as $$Y = WR = bf^H R = b(f^H \odot r^T) = b\tilde{r}^T \quad (3)$$

where ⊙ denotes element-wise multiplication, and $$\tilde{r} = f^* \odot r \quad (4)$$

is the signal r (e.g., the CSI-RS sequence) multiplied by the conjugate of f (the FD precoding vector). From equation (3) it can be concluded that the frequency-dependent precoder matrix W in equation (2) can be replaced by the wideband SD precoding vector, b, if the FD precoding vector, f, is applied on the signal, r, instead of included in the precoding matrix W. This is illustrated in FIG. 6, which illustrates applying f on the signal r to produce modified signal and then applying the SD precoding vector (b) to the modified signal to produce Y, the precoded signal.

The above equations show that, for a given CSI-RS port, the CSI-RS precoder matrix (a.k.a., beamformer) can be made wideband by moving the delay pre-compensation (or more generally, the FD precoding) functionality from the beamformer into the CSI-RS sequence generation. Hence, a wideband beamforming vector (non-frequency dependent), b, can be used over the entire bandwidth.

Using a wideband beamforming vector instead of a frequency selective precoder matrix enables transmitter implementations with a significant reduction in complexity. The calculations also show that any FD precoding vector, e.g. an SVD precoding vector, can be moved from the precoder matrix to the CSI-RS sequence generation as long as the SD and FD precoding vectors are separable according to (2), i.e., the same FD precoding vector is applied on all antennas.

Note that the modification of the CSI-RS sequence according to (4) is transparent to the UE; the UE shall still base its channel estimation on the original sequence r(m) since the objective with the delay pre-compensation is that the UE shall see an effective channel where the delay has been removed. Hence, this is a gNB implementation patent.

In one embodiment, a CSI-RS resource with N ports is configured to the UE from the network. The CSI-RS resource is distributed across L OFDM symbols and each OFDM symbol transmits P CSI-RS ports where P<N. The UE is also configured to report CSI using a Type II port selection codebook. The gNB implementation ensures that each symbol uses a single wideband precoding vector for all P CSI-RS ports, but possibly with different delays for the P ports in that symbol. The delays for these P ports are created by the CSI-RS sequence modification design as described in this invention. Hence, the gNB port scheduler, groups ports belonging to the same beam but with different delay pre-compensation and transmit such group in one OFDM symbol. The above technique can be applied on other downlink signals, e.g., a transmission on the Physical Downlink Shared Channel (PDSCH), demodulation reference signal (DM-RS).

Figure 7A:
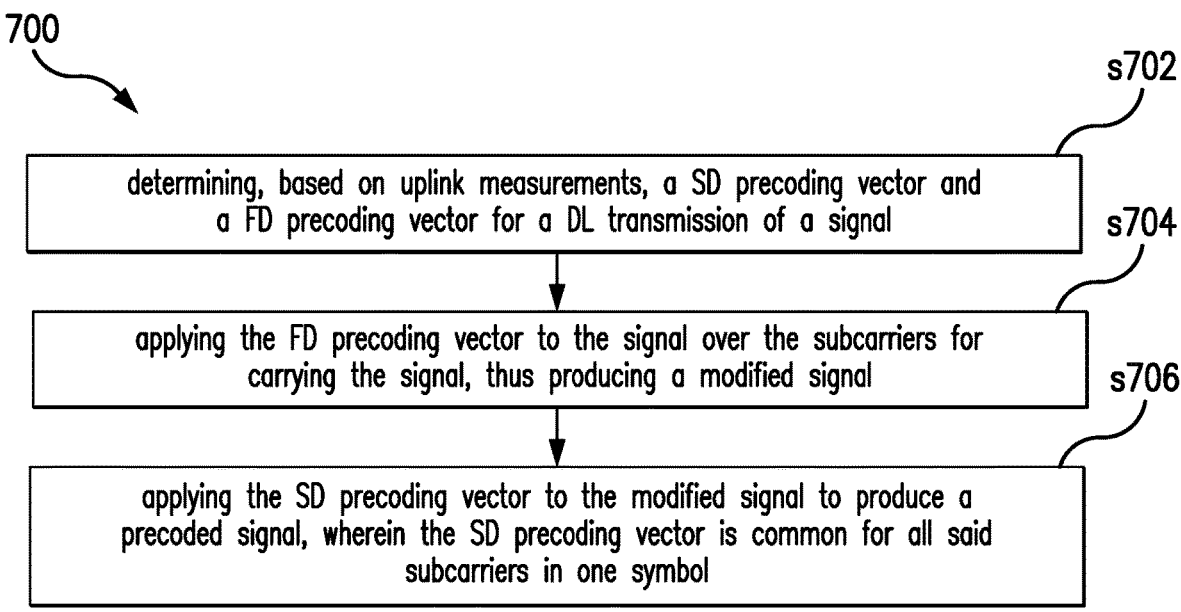
FIG. 7A is a flowchart illustrating a process according to an embodiment.

FIG. 7A is a flowchart illustrating a process 700 for precoding a signal. Process 700 may be performed by gNB 404 and may begin in step s702. Step s702 comprises determining, based on uplink measurements (e.g., based on measurements of as SRS transmitted by a UE), a spatial domain (SD) precoding vector and a frequency domain (FD) precoding vector for a downlink (DL) transmission of the signal. Step s704 comprises applying the FD precoding vector to the signal over the subcarriers for carrying the signal, thus producing a modified signal. Step s706 comprises applying the SD precoding vector to the modified signal to produce a precoded signal, wherein the SD precoding vector is common for all said subcarriers in one symbol (e.g., OFDM symbol).

In some embodiments, the signal is a CSI-RS, the signal is a DM-RS, or the signal is a PDSCH signal (i.e., a transmission on the PDSCH).

In some embodiments the UL measurements are based on a reference signal, RS, transmitted by a UE. In some embodiments the RS is a sounding reference signal, SRS, or the RS is a demodulation reference signal, DMRS.

In some embodiments the FD precoding vector is a DFT vector, thereby achieving delay pre-compensation by applying a phase slope over frequency on the CSI-RS sequence.

In some embodiments applying the FD precoding vector to the signal comprises: generating the conjugate of the FD precoding vector; and calculating $\tilde{r} = f^* \odot r$, where f* is the conjugate of the FD precoding vector, ⊙ denotes element-wise multiplication, r is the signal, and $\tilde{r}$ is the modified signal.

In some embodiments applying the SD precoding vector to the modified signal comprises calculating $b\tilde{r}^T$, where $\tilde{r}^T$ is the transpose of the modified signal, and b is the SD precoding vector.

Figure 7B:
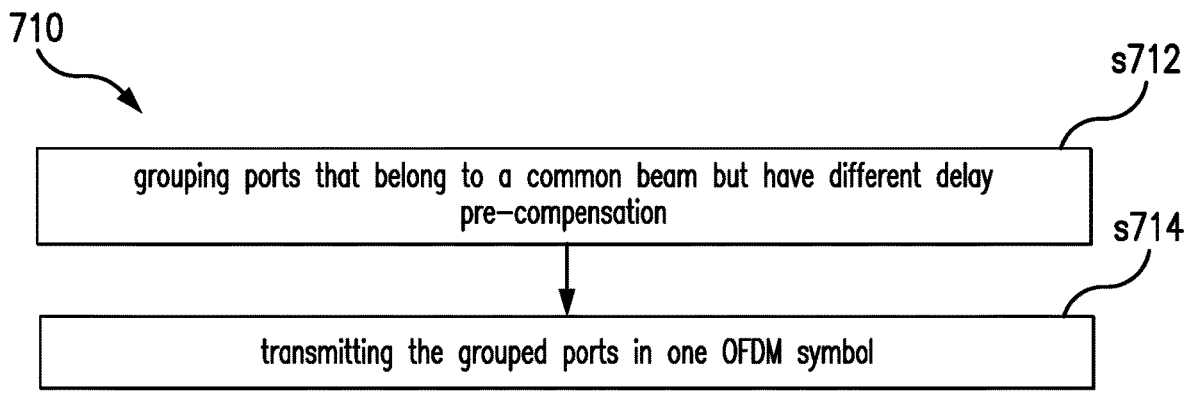
FIG. 7B is a flowchart illustrating a process according to an embodiment.

FIG. 7B is a flowchart illustrating a process 710 for precoding a signal. Process 710 may be performed by gNB 404 and may begin in step s712. Step s712 comprises grouping ports that belong to a common beam but have different delay pre-compensation. Step s714 comprises transmitting the grouped ports in one OFDM symbol.

Figure 7C:
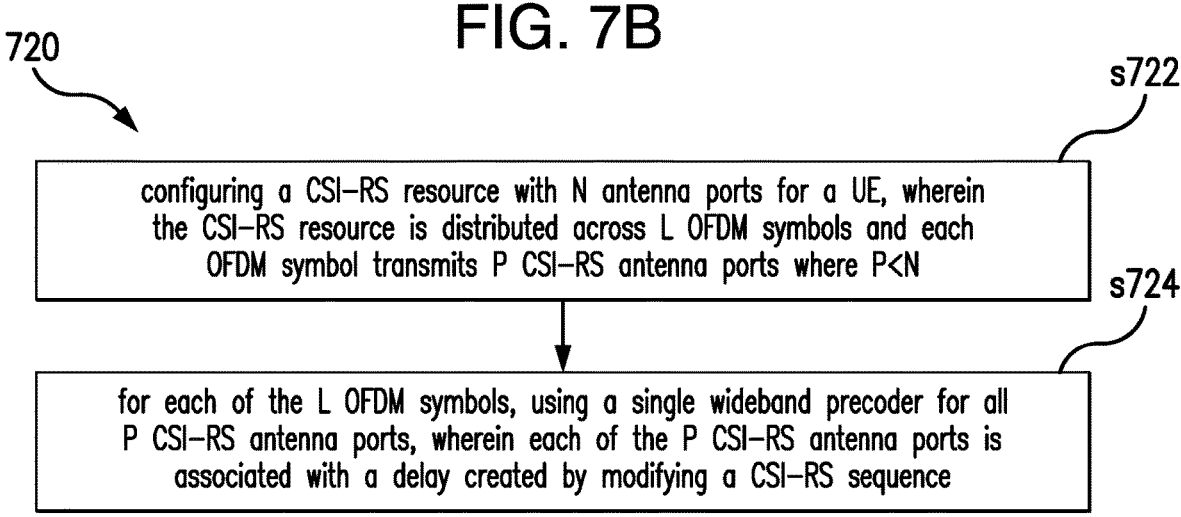
FIG. 7C is a flowchart illustrating a process according to an embodiment.

FIG. 7C is a flowchart illustrating a process 720 for precoding a signal. Process 720 may be performed by gNB 404 and may begin in step s722. Step s722 comprises configuring a CSI-RS resource with N antenna ports for a UE, wherein the CSI-RS resource is distributed across L OFDM symbols and each OFDM symbol transmits P CSI-RS ports where P<N. Step s724 comprises, for each of the L OFDM symbols, using a single wideband precoding vector for all P CSI-RS ports, wherein each of the P CSI-RS ports is associated with a delay created by modifying a CSI-RS sequence.

Figure 8:
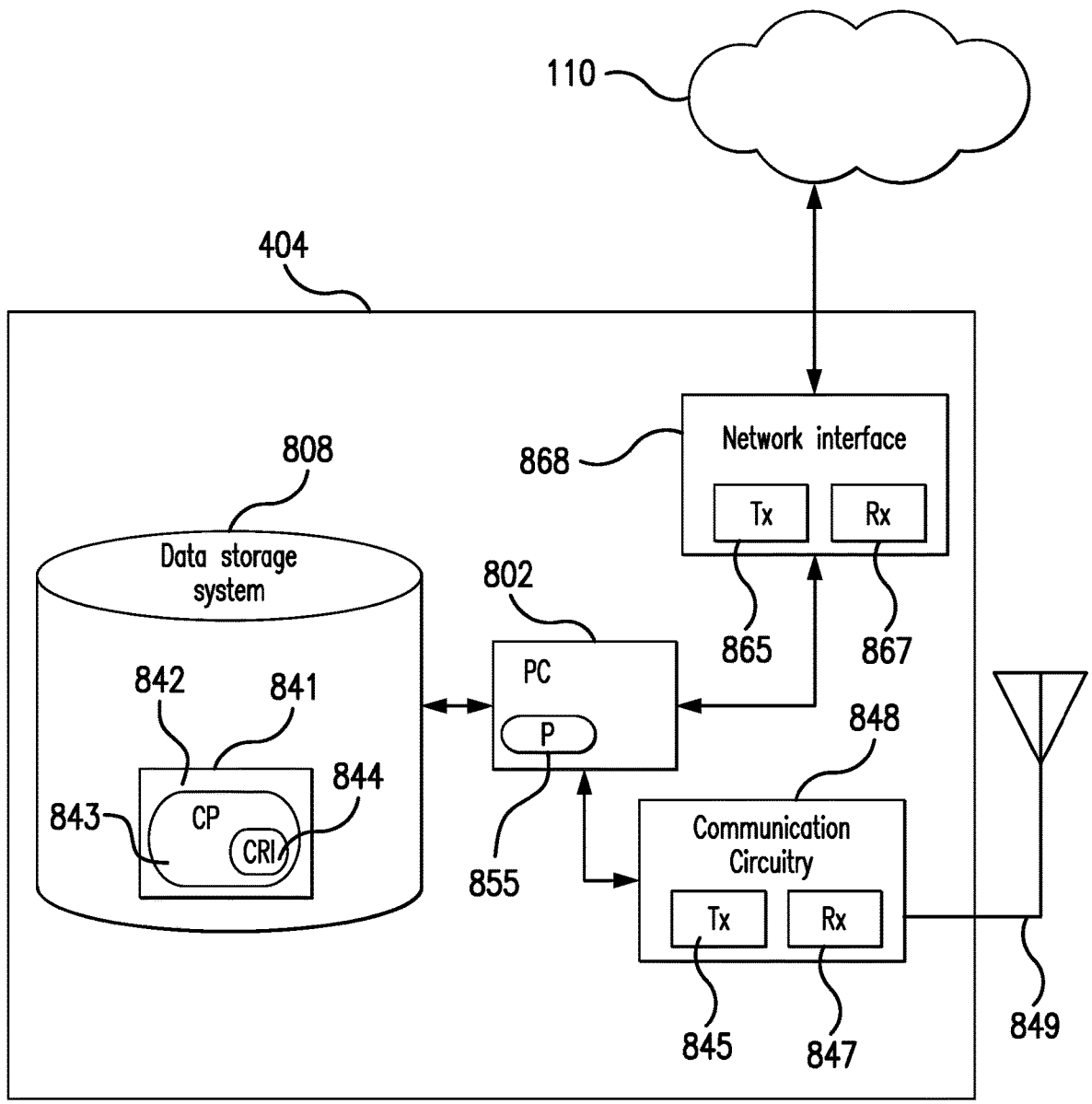
FIG. 8 is a block diagram of a base station according to an embodiment.

FIG. 8 is a block diagram of base station 404, according to some embodiments. As shown in FIG. 8, base station 404 may comprise: processing circuitry (PC) 802, which may include one or more processors (P) 855 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., base station 404 may be a distributed computing apparatus); a network interface 868 comprising a transmitter (Tx) 865 and a receiver (Rx) 867 for enabling base station 404 to transmit data to and receive data from other nodes connected to a network 110 (e.g., an Internet Protocol (IP) network) to which network interface 868 is connected; communication circuitry 848, which is coupled to an antenna arrangement 849 comprising one or more antennas and which comprises a transmitter (Tx) 845 and a receiver (Rx) 847 for enabling base station 404 to transmit data and receive data (e.g., wirelessly transmit/receive data); and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes base station 404 to perform steps described herein (e.g., steps described herein with reference to the flow charts). In other embodiments, base station 404 may be configured to perform steps described herein without the need for code. That is, for example, PC 802 may consist merely of one or more ASICs. Hence, the features of the embodiments described herein may be implemented in hardware and/or software.

SUMMARY OF VARIOUS EMBODIMENTS

A1. A method for precoding a signal (e.g., a CSI-RS, a PDSCH signal, etc.), the method comprising: determining, based on uplink measurements (e.g., based on measurements of as SRS transmitted by a UE), a spatial domain (SD) precoding vector and a frequency domain (FD) precoding vector for a downlink (DL) transmission of the signal; applying the FD precoding vector to the signal over the subcarriers for carrying the signal, thus producing a modified signal; and applying the SD precoding vector to the modified signal to produce a precoded signal, wherein the SD precoding vector is common for all said subcarriers in one symbol (e.g., OFDM symbol).

A2. The method of embodiment A1, wherein the signal is a CSI-RS, the signal is a DM-RS, or the signal is a PDSCH signal.

A3. The method of embodiment A1 or A2, wherein the UL measurements are based on a reference signal, RS, transmitted by a UE.

A4. The method of embodiment of embodiment A3, wherein the RS is a sounding reference signal, SRS, or the RS is a demodulation reference signal, DMRS.

A5. The method of any one of embodiments A1-A4, wherein the FD precoding vector is a DFT vector, thereby achieving delay pre-compensation by applying a phase slope over frequency on the CSI-RS sequence.

A6. The method of any one of embodiments A1-A5, wherein applying the FD precoding vector to the signal comprises: generating the conjugate of the FD precoding vector; and calculating $\tilde{r}=f^* \odot r$, where $f^*$ is the conjugate of the FD precoding vector, $\odot$ denotes element-wise multiplication, r is the signal, and $\tilde{r}$ is the modified signal.

A7. The method of any one of embodiments A1-A6, wherein applying the SD precoding vector to the modified signal comprises calculating $b\tilde{r}^T$, where $\tilde{r}^T$ is the transpose of the modified signal, and b is the SD precoding vector.

A8. A method performed by a base station, the method comprising: grouping ports that belong to a common beam but have different delay pre-compensation; and transmitting the grouped ports in one OFDM symbol.

A9. A method performed by a base station, the method comprising: configuring a CSI-RS resource with N antenna ports for a user equipment, UE (402), wherein the CSI-RS resource is distributed across L OFDM symbols and each OFDM symbol transmits P CSI-RS ports where P<N; and for each of the L OFDM symbols, using a single wideband precoding vector for all P CSI-RS ports, wherein each of the P CSI-RS ports is associated with a delay created by modifying a CSI-RS sequence.

B1. A computer program (843) comprising instructions (844) which when executed by processing circuitry (802) of a base station (404), causes the base station (404) to perform the method of any one of the above embodiments.

B2. A carrier containing the computer program of embodiment B1, wherein the carrier is one of an electronic signal, an optical signal, a radio signal, and a computer readable storage medium (842).

C1. A base station (404), the base station (404) being adapted to perform the method of any one embodiments A1-A9.

D1. A base station (404), the base station (404) comprising: processing circuitry (802); and a memory (842), the memory containing instructions (844) executable by the processing circuitry, whereby the base station (404) is operative to perform the method of any one the embodiments A1-A9.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for precoding a signal, the method comprising:
   determining, based on uplink (UL) measurements, a spatial domain (SD) precoding vector and a frequency domain (FD) precoding vector for a downlink (DL) transmission of the signal;
   applying the FD precoding vector to the signal over subcarriers for carrying the signal, thus producing a modified signal; and
   producing a precoded signal (y) for transmission by applying the SD precoding vector to the modified signal to produce the precoded signal (y) for transmission, wherein the SD precoding vector is common for all said subcarriers in one symbol, wherein
   applying the FD precoding vector to the signal comprises:
       generating the conjugate of the FD precoding vector; and
       calculating $\tilde{r}=f^* \odot r$, where $f^*$ is the conjugate of the FD precoding vector, $\odot$ denotes element-wise multiplication, r is the signal, and $\tilde{r}$ is the modified signal, and
   producing the precoded signal (y) for transmission comprises calculating: $y=b\tilde{r}^T$, where $\tilde{r}^T$ is the transpose of the modified signal, and b is the SD precoding vector, and
   the method further comprises transmitting the precoded signal (y) using multiple antenna ports.

2. The method of claim 1, wherein
   the signal is a Channel State Information reference signal (CSI-RS)
   the signal is a demodulation reference signal, or
   the signal is a Physical Downlink Shared Channel signal.

3. The method of claim 1, wherein the UL measurements are based on a reference signal (RS) transmitted by a user equipment, UE.

4. The method of claim of claim 3, wherein
   the RS is a sounding reference signal, or
   the RS is a demodulation reference signal.

5. The method of claim 1, wherein the FD precoding vector is a discrete Fourier Transform vector.

6. A non-transitory computer readable storage medium storing a computer program comprising instructions which when executed by processing circuitry of a base station, causes the base station to perform the method of claim 1.

7. A base station for precoding a signal, the base station being configured to perform a method comprising:
   determining, based on uplink (UL) measurements, a spatial domain (SD) precoding vector and a frequency domain (FD) precoding vector for a downlink (DL) transmission of the signal;
   applying the FD precoding vector to the signal over subcarriers for carrying the signal, thus producing a modified signal; and
   producing a precoded signal (y) for transmission by applying the SD precoding vector to the modified signal to to produce the precoded signal (y) for transmission, wherein the SD precoding vector is common for all said subcarriers in one symbol, wherein
   applying the FD precoding vector to the signal comprises:
      generating the conjugate of the FD precoding vector; and
      calculating $\tilde{r} = f^* \odot r$, where $f^*$ is the conjugate of the FD precoding vector, $\odot$ denotes element-wise multiplication, r is the signal, and $\tilde{r}$ is the modified signal, and
   producing the precoded signal (y) for transmission comprises calculating: $y = b\tilde{r}^T$, where $\tilde{r}^T$ is the transpose of the modified signal, and b is the SD precoding vector, and
   the method further comprises transmitting the precoded signal (y) using multiple antenna ports.

8. The base station of claim 7, wherein
   the signal is a Channel State Information reference signal,
   the signal is a demodulation reference signal, or
   the signal is a Physical Downlink Shared Channel signal.

9. The base station of claim 7, wherein the UL measurements are based on a reference signal (RS) transmitted by a user equipment, UE.

10. The base station of claim of claim 9, wherein
    the RS is a sounding reference signal, or
    the RS is a demodulation reference signal.

11. The base station of claim 7, wherein the FD precoding vector is a discrete Fourier Transform vector.

* * * * *

UNITED STATES PATENT AND TRADEMARK OFFICE
CERTIFICATE OF CORRECTION

PATENT NO. : 12,308,911 B2
APPLICATION NO. : 18/270446
DATED : May 20, 2025
INVENTOR(S) : Athley et al.

It is certified that error appears in the above-identified patent and that said Letters Patent is hereby corrected as shown below:

In the Specification

In Column 1, Line 44, delete "precoder" and insert -- precoding --, therefor.

In Column 3, Line 45, delete "$c_{init}=(2^{10}(N_{symb}^{slot}n_{s,f}^u+l+1)(2n_{ID}+1)+n_{ID})\bmod 2^-$" and insert -- $c_{init}=(2^{10}(N_{symb}^{slot}n_{s,f}^u+l+1)(2n_{ID}+1)+n_{ID})\bmod 2^{32}$ --, therefor.

In Column 4, Line 22, delete "$(k_i, l_i),$" and insert -- $(k_i, l_{i'})$, --, therefor.

In Columns 3 & 4, in Table 1, Line 10, delete "$(k1, l_0)$" and insert -- $(k_1, l_0)$ --, therefor.

In Columns 5 & 6, in Table 1, Line 8, delete "$(k_0, 4),$" and insert -- $(k_0, l_1)$, --, therefor.

In Column 5, Line 21, delete "setting" and insert -- set --, therefor.

In Column 6, Lines 34-35, delete "$W_l=W_l\tilde{W}_{2,l}W_{f,l}^H,$" and insert -- $W_l=W_1\tilde{W}_{2,l}W_{f,l}^H$, --, therefor.

In Column 6, Line 67, delete "where if" and insert -- where --, therefor.

Signed and Sealed this
Sixteenth Day of December, 2025

John A. Squires
*Director of the United States Patent and Trademark Office*